US010685102B2

(12) United States Patent
VanBlon et al.

(10) Patent No.: US 10,685,102 B2
(45) Date of Patent: Jun. 16, 2020

(54) PERFORMING ACTIONS AT A LOCKED DEVICE RESPONSIVE TO GESTURE

(71) Applicant: Lenovo (Singapore) Pte. Ltd., Singapore (SG)

(72) Inventors: Russell S. VanBlon, Raleigh, NC (US); Robert J. Kapinos, Durham, NC (US); Timothy W. Kingsbury, Cary, NC (US); Scott W. Li, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 172 days.

(21) Appl. No.: 15/844,737

(22) Filed: Dec. 18, 2017

(65) Prior Publication Data

US 2019/0188363 A1 Jun. 20, 2019

(51) Int. Cl.
| G06F 21/32 | (2013.01) |
| G06K 9/00 | (2006.01) |
| G06F 3/0488 | (2013.01) |
| G06F 3/0481 | (2013.01) |
| G06F 3/0484 | (2013.01) |
| G06F 9/451 | (2018.01) |
| G06F 3/0482 | (2013.01) |
| G06F 9/445 | (2018.01) |

(52) U.S. Cl.
CPC ............ *G06F 21/32* (2013.01); *G06F 3/0481* (2013.01); *G06F 3/0482* (2013.01); *G06F 3/04842* (2013.01); *G06F 3/04883* (2013.01); *G06F 9/451* (2018.02); *G06K 9/00013* (2013.01); *G06K 9/00087* (2013.01); *G06F 9/445* (2013.01)

(58) Field of Classification Search
CPC ...... G06F 21/32; G06F 3/04883; G06F 9/445; G06K 9/00087; G06K 9/00013
See application file for complete search history.

(56) References Cited

U.S. PATENT DOCUMENTS

| 2003/0084109 | A1* | 5/2003 | Balluff | ................. G06F 3/0481 709/206 |
| 2008/0220752 | A1* | 9/2008 | Forstall | ................... H04M 1/56 455/415 |
| 2010/0146235 | A1* | 6/2010 | Weber | .................... G06Q 30/06 711/165 |
| 2017/0316250 | A1* | 11/2017 | Roh | .................... G06K 9/00087 |
| 2018/0101297 | A1* | 4/2018 | Yang | .................... G06F 3/04883 |
| 2018/0365477 | A1* | 12/2018 | Seol | ...................... H04M 1/725 |
| 2019/0050600 | A1* | 2/2019 | Sahoo | ................. G06F 21/6281 |
| 2019/0213344 | A1* | 7/2019 | Hesketh | .............. G06F 21/6218 |
| 2019/0266374 | A1* | 8/2019 | Lee | ......................... G06F 3/017 |

* cited by examiner

*Primary Examiner* — Utpal D Shah
(74) *Attorney, Agent, or Firm* — VanLeeuwen & VanLeeuwen; Jason A. Friday

(57) ABSTRACT

An approach is disclosed that receives a gesture from a user at a locked touch enabled device. The gesture received includes both a notification selection and the user's fingerprint. An action is then performed at the device, with the action that is performed being based on the notification that was selected.

17 Claims, 6 Drawing Sheets

PERFORMING ACTIONS AT A LOCKED DEVICE RESPONSIVE TO GESTURE

BACKGROUND

When logging in with fingerprint on a mobile device, traditional approaches do not provide a good way to launch to a notification and these approaches require multiple inputs to use fingerprint inputs while activating a notification. The user must login with their fingerprint and then open the application with the notification, which could require changing workspaces and launching the desired app. The user could also turn on the screen and activate the notification before logging in, but this requires up to three separate inputs including turning on the screen, double-tapping the notification, and swiping the user's fingerprint.

SUMMARY

An approach is disclosed that receives a gesture from a user at a locked touch enabled device. The gesture received includes both a notification selection and the user's fingerprint. An action is then performed at the device, with the action that is performed being based on the notification that was selected.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

Figure 1:
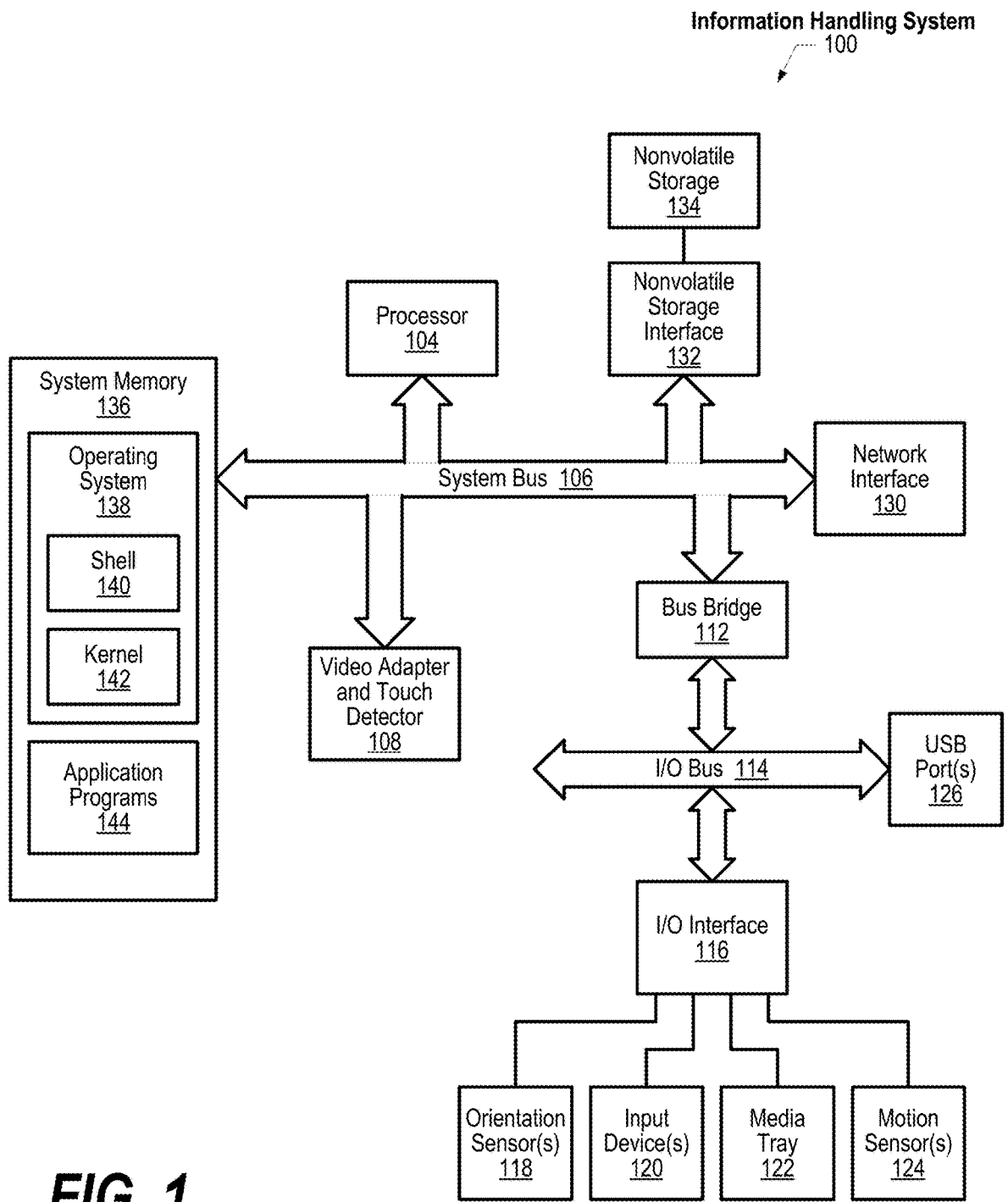
FIG. 1 is a block diagram of a data processing system in which the methods described herein can be implemented.

FIGS. 1-6 depict an approach that provides fingerprint login that coincides with notification activation. This approach allows the user to login with the user's fingerprint and launch a notification using a single touch input. Embodiments of the approach each allow the user to login with a fingerprint combined with a slide or swipe action to open the desired notifications. In a first embodiment, the user logs in using the user's fingerprint and, until the user's finger is lifted from the sensor (touch enabled screen surface), notifications remain on the screen. When login completes, the notifications remain visible or are made transparent. The user can slide their finger from the fingerprint sensor to the desired notification in order to open the desired notification. In a second embodiment, the user selects the desired onscreen notification and, before lifting their finger from the screen, the user slides the finger to the fingerprint sensor. After the fingerprint is authenticated, the desired notification is launched using the appropriate software application (or "app"). In a third embodiment, the user places his fingertip on a desired notification and the user's fingerprint is received from the touch enable device at the same place where the notification appears. Each of these embodiments allow the user to open a desired application with a fingertip by using a single action (e.g., "touch and slide," "touch and remain," etc.) action, as opposed to having to perform multiple separate steps as required by traditional systems. This approach can be implemented using a "static" style fingerprint reader or a "dynamic" style fingerprint reader. Each of the embodiments described above work well for static and dynamic fingerprint readers. "Swipe" style fingerprint readers can also be used.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium does not include a computer readable signal medium.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
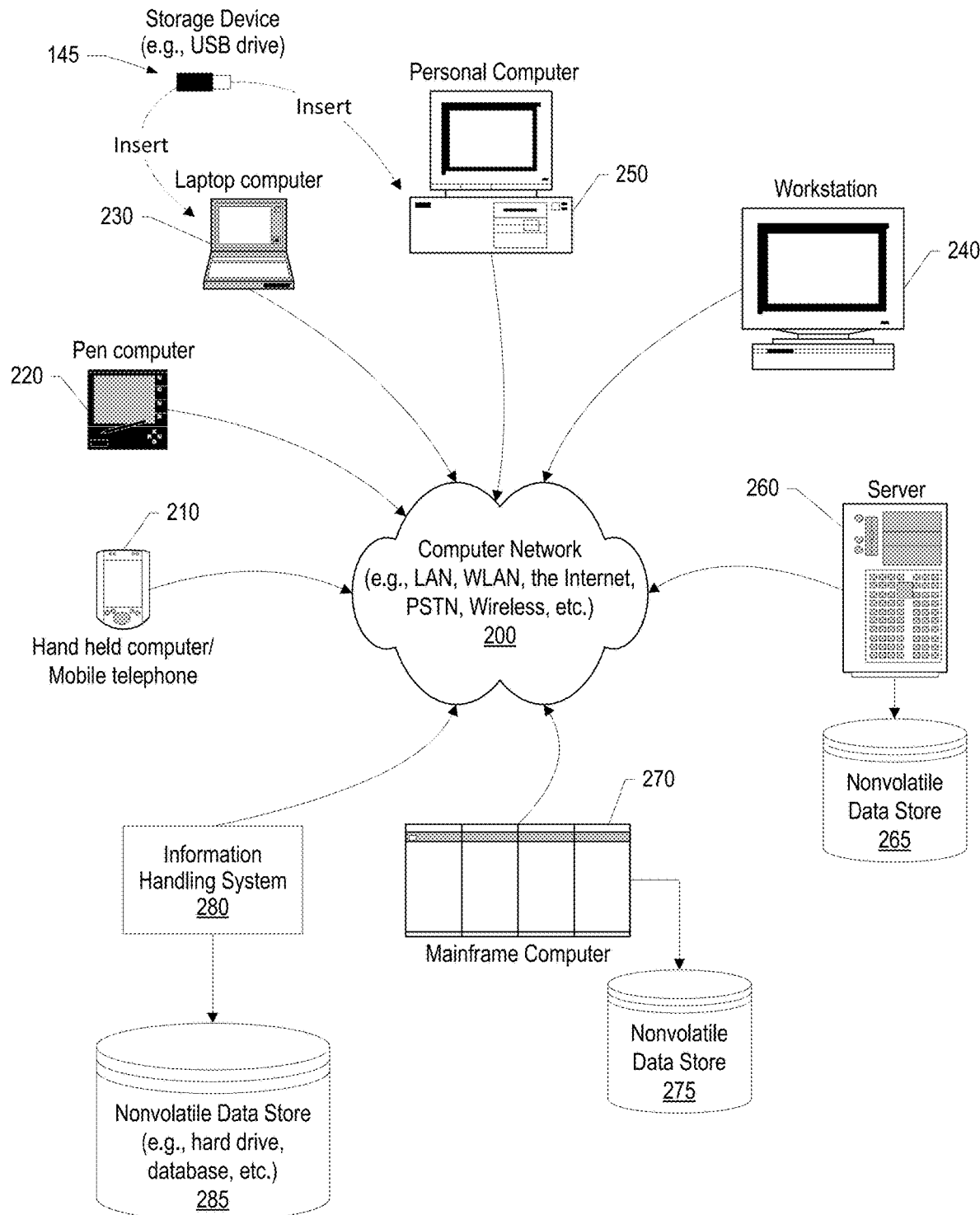
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Note that some or all of the exemplary architecture, including both depicted hardware and software, shown for and within information handling system 100 may be utilized by a software deploying server, such as one of the servers shown in FIG. 2.

Information handling system 100 includes processor 104 that is coupled to system bus 106. Processor 104 may utilize one or more processors, each of which has one or more processor cores. Video adapter 108, which drives/supports touch screen display 110, is also coupled to system bus 106. In one embodiment, touch detector 108 is capable of reading a user's fingerprint from a fingertip placed on the touch screen. System bus 106 is coupled via bus bridge 112 to input/output (I/O) bus 114. I/O interface 116 is coupled to I/O bus 114. I/O interface 116 affords communication with various I/O devices, including orientation sensor 118, input device(s) 120, media tray 122 (which may include additional storage devices such as CD-ROM drives, multi-media interfaces, etc.), motion sensor 124, and external USB port(s) 126. In one embodiment, input devices 120 include fingerprint reader that reads a fingerprint from a user's fingertip pressed on an input area of the device corresponding to the fingerprint reader.

Orientation sensor(s) 118 are one or more sensors and/or associated logic that senses the physical/spatial orientation of information handling system 100. For example, a simple gravity detector can tell if the information handling system is being held right-side-up, upside down, parallel to or perpendicular to the ground (e.g., a walking surface), at some other angle relative to the ground, etc. In another example, orientation sensor 118 is a set of accelerometers, strain gauges, etc. that provide real-time information describing the physical orientation of information handling system 100 in three-dimensional space, including such orientation with respect to the earth/ground/floor. One or more of these orientation sensors determine if the display screen layer is positioned in a "portrait" mode or a "landscape" mode.

Motion sensor(s) 124 include one or more sensors and/or associated logic that senses the direction, speed, and/or acceleration of movement of information handling system 100 and components such as the keyboard layer, touch layer, and display screen layer. For example, a combination of accelerometers, strain gauges, etc. (described above with respect to orientation sensor 118) can also be used to detect how fast and in what direction information handling system 100 or the individual components is moving, as well as the acceleration of movement of information handling system 100 or the individual components. For example, motion sensor 124, either alone or in combination with the orientation sensor 118 described above, is able to detect if information handling system 100 is being handed from one person to another based on the rate of acceleration during the hand-off (e.g., faster than normal walking acceleration), the yaw orientation of information handling system 100 during the hand-off (e.g., a rotating movement indicating that the computer is being turned around for another person to see during a hand-off of the computer from one person to another), the pitch orientation of information handling system 100 during the hand-off (e.g., the front of information handling system 100 being tilted upwards during the hand-off of the computer from one person to another), and/or the roll orientation of information handling system 100 during the hand-off (e.g., a side of the computer rolling upwards during the hand-off of the computer of the computer from one person to another). In one embodiment, motion sensor 124 (alone or in combination with orientation sensor 118) is able to detect an oscillating motion of information handling system 100, such as that motion created with a user is walking and holding a tablet computer in her hand (and at her side) while swinging her arms forward and backward.

Nonvolatile storage interface 132 is also coupled to system bus 106. Nonvolatile storage interface 132 interfaces with one or more nonvolatile storage devices 134. In one embodiment, nonvolatile storage device 134 populates system memory 136, which is also coupled to system bus 106. System memory includes a low level of volatile memory. This volatile memory also includes additional higher levels of volatile memory, including cache memory, registers and buffers. Data that populates system memory 136 includes information handling system 100's operating system (OS) 138 and application programs 144. OS 138 includes a shell 140, for providing transparent user access to resources such as application programs 144. As depicted, OS 138 also includes kernel 142, which includes lower levels of functionality for OS 138, including providing essential services required by other parts of OS 138 and application programs 144, including memory management, process and task management, disk management, and mouse and keyboard management.

The hardware elements depicted in information handling system 100 are not intended to be exhaustive, but rather are representative to highlight essential components required by the present invention. For instance, information handling system 100 may include alternate memory storage devices such as magnetic cassettes, digital versatile disks (DVDs), Bernoulli cartridges, and the like. These and other variations are intended to be within the spirit and scope of the present invention.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
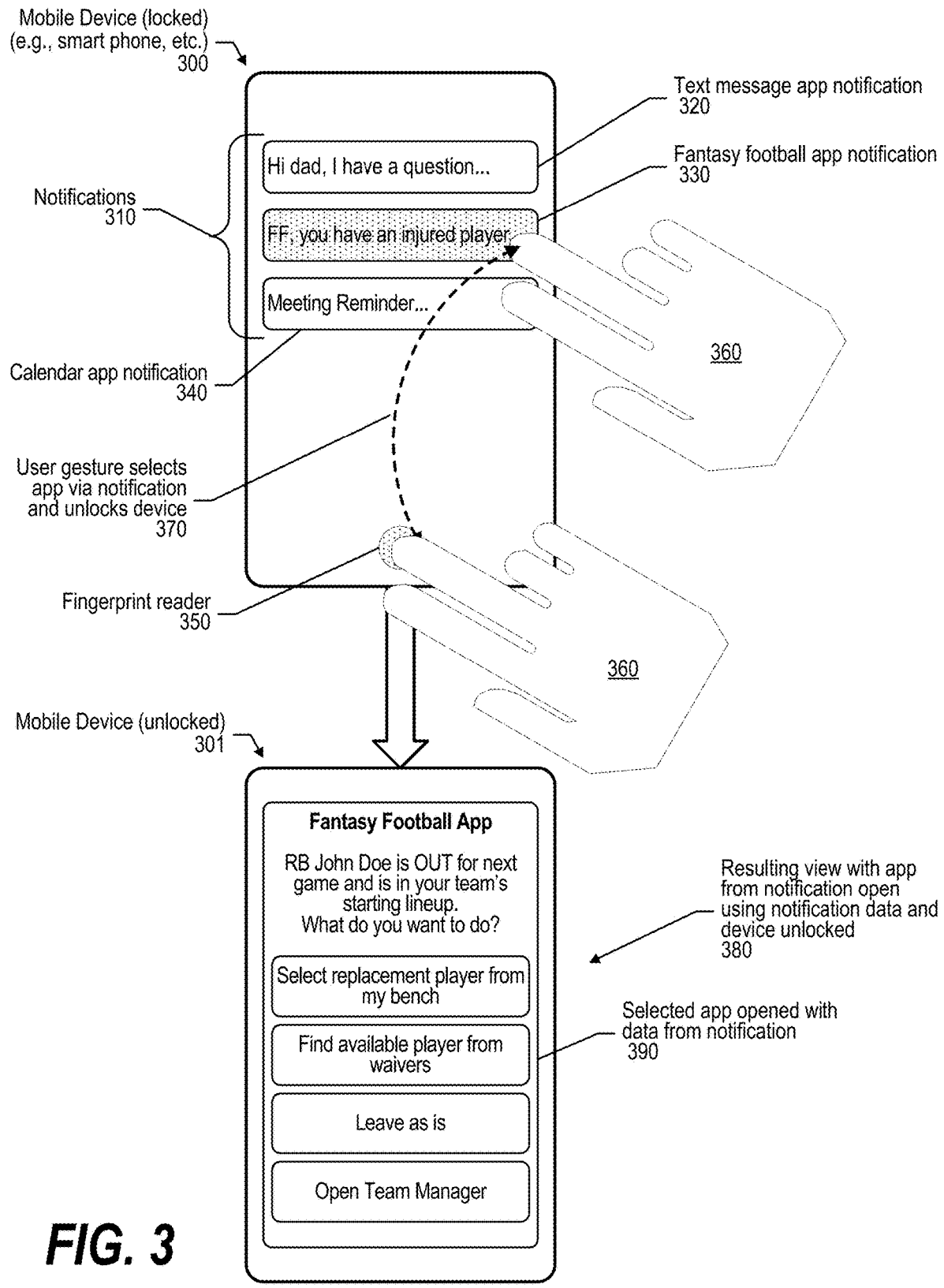
FIG. 3 is a diagram depicting components used in a first embodiment of an approach that provides fingerprint login coinciding with notification activation.

FIG. 3 is a diagram depicting components used in a first embodiment of an approach that provides fingerprint login coinciding with notification activation. Mobile device 300 is a touch enabled device, such as a smart phone, upon which gestures can be received. Gestures are applied to the touch enabled device by a user's fingertip 360.

In the example shown, mobile device is in a locked state where actions are generally not allowed at the device until a user is authenticated to the device, such as with a code (PIN code, password, etc.) or using a biometric, such as fingerprint recognition of an authorized user's fingerprint. Notifications 310 appear on mobile device 300 when the device is in the locked state. Notifications can appear from any number of applications that execute on mobile device 300 including text messages 320 that correspond to a text messaging application (or "app"), calendar notifications 340 that correspond to a calendar app, specialized notifications, such as fantasy football notification 330 that corresponds to a fantasy football app. In the example shown in FIG. 3, "swipe" gesture 370 is shown with the user commencing the gesture by making a notification gesture and swiping towards fingerprint reader 350 which is located in a fixed location on the mobile device. This one gesture both opens the app corresponding to the selected notification as well as unlocks the mobile device so that the user can work with the app that corresponds to the notification. In the example shown, the notification selection is fantasy football notification 330 that indicated that one of the user's fantasy football players is injured. The user has selected the notification using the gesture in order to open the fantasy football app and provide the notification to the app as an input so that the injured player can be dealt with quickly. The result of the user's "swipe" gesture 370 is unlocked mobile device 301 upon which the app that corresponds to the notification selection is open and appears on the screen. Resulting view 380 of the unlocked mobile device 301 shows the app, in this case the fantasy football app, being opened with the input from the notification selection provided to the app, as shown in app view 390. In this case, the notification pertains to an injured player ("John Doe") that is not playing ("OUT") for the next game but is currently in the user's fantasy football lineup. In the example shown, the fantasy football app is opened with a view that allows the user to make selections regarding the injured player without having to navigate through the entire fantasy football app and remember the name of the injured player.

Figure 4:
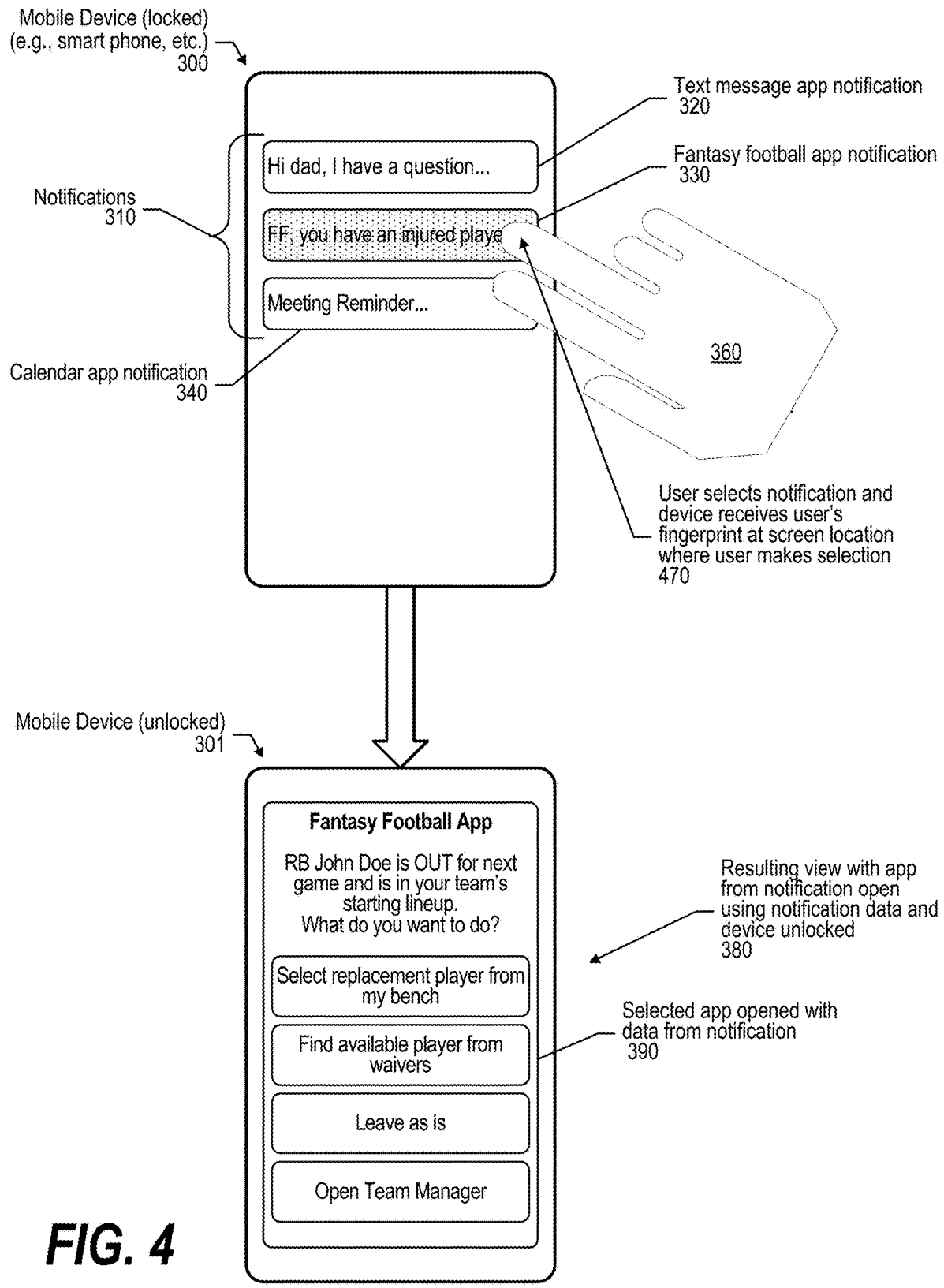
FIG. 4 is a diagram depicting components used in a second embodiment of an approach that provides fingerprint login coinciding with notification activation.

FIG. 4 is a diagram depicting components used in a second embodiment of an approach that provides fingerprint login coinciding with notification activation. The notification selection and corresponding app that is responsively opened in FIG. 4 is the same as the example shown in FIG. 3. However, in FIG. 4, single gesture 470 is received with the user both selecting the desired notification (e.g., the fantasy football notification, etc.) as well as inputting the user's fingertip at the same screen location where the desired notification appeared on the screen. In this example, mobile device 300 incorporates a dynamic fingerprint reader that is able to read the user's fingerprint from anywhere on the screen surface so the user does not have to move the user's fingertip from the desired notification to a specific area on the device reserved for fingerprint reading, as was the case in the example shown in FIG. 3.

Figure 5:
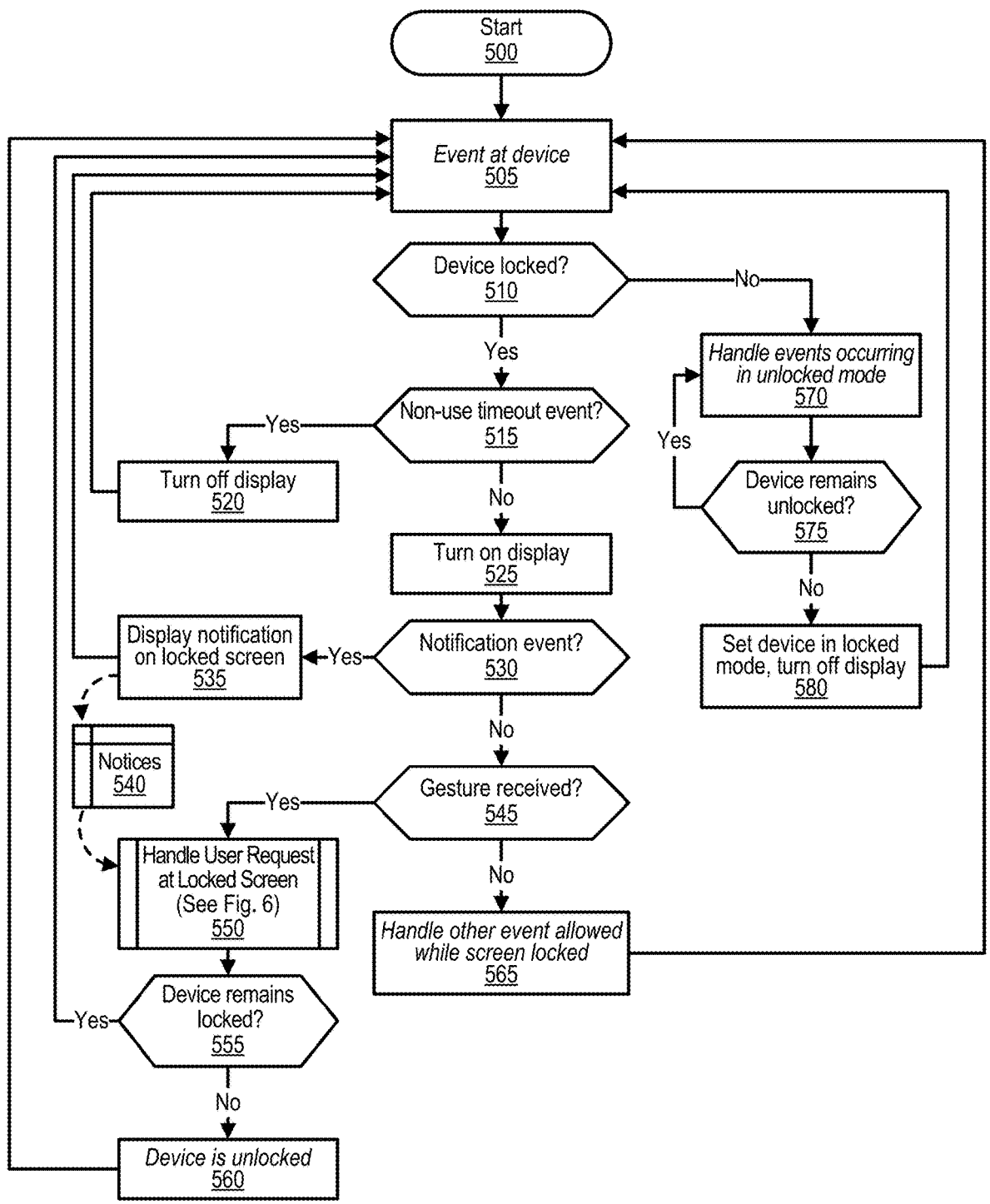
FIG. 5 is a flowchart showing a process that performs steps that provide fingerprint login coinciding with notification activation.

FIG. 5 is a flowchart showing a process that performs steps that provide fingerprint login coinciding with notification activation. FIG. 5 processing commences at 500 and shows the steps taken by a process that executes actions from a locked touch enabled device using a single gesture. At step 505, an event is received at device. The event can be a timeout event, a notification event, a gesture event, and the like. The process determines as to whether the device is currently locked (decision 510). If the device is currently locked, then decision 510 branches to the 'yes' branch to perform steps 515 through 565 that are performed when the device is in a locked state. On the other hand, if the device is currently unlocked, then decision 510 branches to the 'no' branch to perform steps 570 through 580 that are performed when the device is in an unlocked state.

Steps 515 through 565 are performed when the device is in a locked state. The process next determines whether a non-use timeout event has occurred (decision 515). If a non-use timeout event has occurred, then decision 515 branches to the 'yes' branch whereupon, at step 520, the display is turned off to conserve battery life and processing loops back to step 505 to wait for the next event to occur. On the other hand, if a non-use timeout event has not occurred, then decision 515 branches to the 'no' branch to continue processing to identify the event that has occurred. If a non-use timeout event is not the event that occurred then, at step 525, the process turns on the display at the mobile device. The process next determines as to whether a notification event has occurred (decision 530). If a notification event has occurred, then decision 530 branches to the 'yes' branch whereupon, at step 535, the process displays the received notification on the locked screen so that the user can view the notification such as the notifications that appear on locked mobile device screen 300 shown in FIG. 3. The notifications (e.g., text, etc.) such as those shown in notification 310 in the example shown in FIG. 3, are stored in memory area 540. Processing then loops back to step 505 to wait for the next event to occur. On the other hand, if a notification event has not occurred, then decision 530 branches to the 'no' branch to continue processing to identify the event that has occurred.

The process next determines as to whether a gesture event has occurred with a gesture having been received at the locked mobile device screen (decision 530). If a gesture event has occurred, then decision 545 branches to the 'yes' branch to perform steps 550 through 560 to process the gesture. On the other hand, if a gesture event has not occurred, then decision 530 branches to the 'no' branch whereupon, at step 565, the process handles whatever other event has occurred at the device and then processing loops back to step 505 to handle the next event received at the device.

Steps 550 through 560 are performed when a gesture event is received at the locked mobile device. At predefined process 550, the process performs the Handle User Request at Locked Screen routine (see FIG. 6 and corresponding text for processing details). The process determines as to whether the device remains in a locked state after the processing performed by predefined process 550 (decision 555). If the device remains in a locked state, then decision 555 branches to the 'yes' branch which loops back to step 505 keeping the device in the locked state. On the other hand, if the device is in an unlocked state, then decision 555 branches to the 'no' branch whereupon, at step 560, the device is set to an unlocked state and processing then loops back to step 505 to handle the next event received at the device.

Returning to decision 510, steps 570 through 580 are performed when the device is in an unlocked state and an event is received at the device. At step 570, the process handles any and all events that occur at the device while the device is in an unlocked state, or mode. One of the events can be to lock the device. The process determines as to whether the device remains in the unlocked state (decision 575). If the device remains unlocked, then decision 575 branches to the 'yes' branch which loops back to step 570 to continue handling events that occur when the device is unlocked. On the other hand, if the device is locked, then decision 575 branches to the 'no' branch whereupon, at step 580, the device is set to the locked state, or mode, and processing loops back to step 505 to process events received when the device is in the locked state, as previously described.

Figure 6:
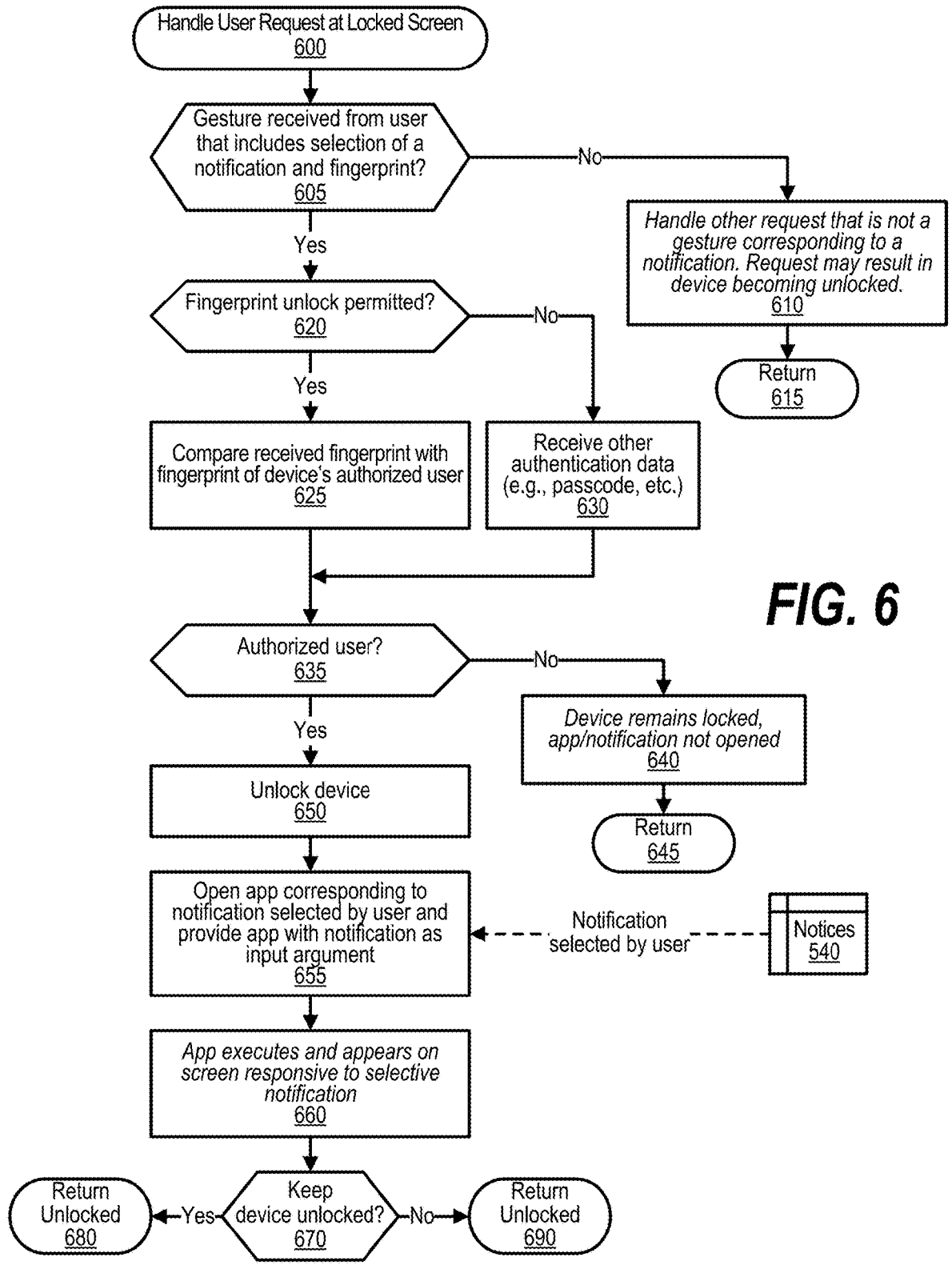
FIG. 6 is a flowchart showing a process that performs steps that handle user requests at a locked screen that appears on a user's device that is enabled to perform fingerprint login that coincides with notification activation.

FIG. 6 is a flowchart showing a process that performs steps that handle user requests at a locked screen that appears on a user's device that is enabled to perform fingerprint login that coincides with notification activation. FIG. 6 processing commences at 600 and shows the steps taken by a process that handles user requests received at a locked screen of a touch enabled device. The process determines as to whether the gesture that was received from the user is a gesture that includes the selection of a notification and the user's fingerprint, as shown in FIGS. 3 and 4 (decision 605).

If a gesture was received that includes the selection of a notification and the user's fingerprint, then decision 605 branches to the 'yes' branch to process the gesture. On the other hand, if a different request or gesture was received, then decision 605 branches to the 'no' branch whereupon, at step 610, the process handles the other such request that is not a gesture that includes a notification and a fingerprint. Such other request, such as an unlock request, may result in the device becoming unlocked in which case the device is set to the unlocked state, rather than locked state, at 615. Otherwise, if the request does not unlock the device, then processing returns to the calling routine at 615 with the device remaining locked.

Steps 620 through 690 are performed if the request that is received is a gesture that includes both a notification as well as the user's fingerprint. The process determines whether the device allows for fingerprint unlocking of the device (decision 620). If fingerprint unlocking is permitted, then decision 620 branches to the 'yes' branch whereupon, at step 625, the process compares the finger that is received with the gesture to one or more fingerprints each of which corresponds to an authorized user. On the other hand, if fingerprint unlocking is not permitted, then decision 620 branches to the 'no' branch whereupon, at step 630, the process receives some other authentication data pertaining to the user, such as a passcode.

The process determines whether the user is an authorized user based on the authentication step performed at either step 625 or 630 (decision 635). If the user is an authorized user, then decision 635 branches to the 'yes' branch to perform steps 650 through 690. On the other hand, if the user is not an authorized user, then decision 635 branches to the 'no' branch whereupon, at step 640, the device remains in the locked state and the application (app) and notification are not opened in the device and processing returns to the calling routine at 645 with the device remaining in the locked state.

Steps 650 through 690 are performed when an authorized user performs the gesture at the locked device that includes both a notification as well as the user's fingerprint. At step 650, the process unlocks the device. At step 655, the process opens (executes) the application (app) that corresponds to the notification selected by the user with notification data being retrieved from memory area 540. The process displays the application's user interface with the notification being input to the application as an input argument. At step 660, the application (app) corresponding to the notification selection executes and appears on the screen of the device. With many applications, a user interface will appear that allows the user to work with the notification selection.

After the user is finished using the application, the process next determines whether to keep device the unlocked or lock the device (decision 670). This decision may be based on a configuration setting that allows the user to determine whether to keep the device locked after the application responsive to the notification gesture that included the user's fingerprint is finished executing. If the device is being kept unlocked, then decision 670 branches to the 'yes' branch whereupon processing returns to the calling routine with an indication that the device is to remain unlocked at 680. On the other hand, if the device is being kept in a locked state, then decision 670 branches to the 'no' branch whereupon processing returns to the calling routine with an indication that the device is to remain in a locked state at 690.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method comprising:
   receiving, at a locked touch enabled device, a gesture that includes a notification selection and a user's fingerprint, wherein the gesture is a single motion with a user's fingertip providing the user's fingerprint and selecting the first notification without the user's fingertip leaving a surface of the touch enabled device, wherein the notification selection selects a first notification from a plurality of notifications displayed on the touch-enabled device, and wherein the first notification corresponds to a first application and at least one of the other plurality of notifications corresponds to a second application; and
   performing an action at the device, wherein the action includes executing the first application at the device and providing the notification selection as an input to the first application.

2. The method of claim 1 further comprising:
   after executing the application:
      automatically locking the device so that the device remains in a locked state.

3. The method of claim 1 wherein the receiving of the gesture further comprises:
   detecting the notification selection by a fingertip pressed at an area of a touch-enabled screen included in the device, wherein the user's fingerprint is received from the fingertip at the area of the touch-enabled screen.

4. The method of claim 1 wherein the receiving of the gesture further comprises:
   detecting the notification selection by a fingertip pressed at a first area of the device that is on a surface of a touch-enabled screen included in the device; and
   detecting a sliding motion of the fingertip from the first area to a second area of the device, wherein the second area of the device is a fingerprint sensor where the user's fingerprint is received.

5. The method of claim 1 further comprising:
   comparing the user's fingerprint to one or more authorized fingerprints corresponding to one or more authorized uses of the device, wherein the action is performed in response to the user's fingerprint matching one of the authorized fingerprints; and
   inhibiting performance of the action in response to the user's fingerprint failing to match any of the authorized fingerprints.

6. The method of claim 1 further comprising:
   unlocking the device in response to the user's fingerprint being authenticated.

7. An information handling system comprising:
   one or more processors;
   a memory accessible by at least one of the processors;
   a set of instructions stored in the memory and executed by at least one of the processors to:
   receive, at a locked touch enabled device, a gesture that includes a notification selection and a user's fingerprint, wherein the gesture is a single motion with a user's fingertip providing the user's fingerprint and selecting the first notification without the user's fingertip leaving a surface of the touch enabled device, wherein the notification selection selects a first notification from a plurality of notifications displayed on the touch-enabled device, and wherein the first notification corresponds to a first application and at least one of the other plurality of notifications corresponds to a second application; and perform an action at the device, wherein the action includes execution of the first application at the device and providing of the notification selection as an input to the first application.

8. The information handling system of claim 7 further comprising additional instructions that are further executed by the processors to:
after execution of the application:
automatically lock the device so that the device remains in a locked state.

9. The information handling system of claim 7 wherein the receiving of the gesture further comprises additional instructions that are further executed by the processors to:
detect the notification selection by a fingertip pressed at an area of a touch-enabled screen included in the device, wherein the user's fingerprint is received from the fingertip at the area of the touch-enabled screen.

10. The information handling system of claim 7 wherein the receiving of the gesture further comprises additional instructions that are further executed by the processors to:
detect the notification selection by a fingertip pressed at a first area of the device that is on a surface of a touch-enabled screen included in the device; and
detect a sliding motion of the fingertip from the first area to a second area of the device, wherein the second area of the device is a fingerprint sensor where the user's fingerprint is received.

11. The information handling system of claim 7 further comprising additional instructions that are further executed by the processors to:
compare the user's fingerprint to one or more authorized fingerprints corresponding to one or more authorized uses of the device, wherein the action is performed in response to the user's fingerprint matching one of the authorized fingerprints; and
inhibit performance of the action in response to the user's fingerprint failing to match any of the authorized fingerprints.

12. The information handling system of claim 7 further comprising additional instructions that are further executed by the processors to:
unlock the device in response to the user's fingerprint being authenticated.

13. A computer program product comprising:
a non-transitory computer readable storage medium comprising a set of computer instructions, the computer instructions effective to:

receive, at a locked touch enabled device, a gesture that includes a notification selection and a user's fingerprint, wherein the gesture is a single motion with a user's fingertip providing the user's fingerprint and selecting the first notification without the user's fingertip leaving a surface of the touch enabled device, wherein the notification selection selects a first notification from a plurality of notifications displayed on the touch-enabled device, and wherein the first notification corresponds to a first application and at least one of the other plurality of notifications corresponds to a second application; and perform an action at the device, wherein the action includes execution of the first application at the device and providing of the notification selection as an input to the first application.

14. The computer program product of claim 13 further comprising additional computer instructions that are further effective to:
after execution of the application:
automatically lock the device so that the device remains in a locked state.

15. The computer program product of claim 13 wherein the receiving of the gesture further comprises additional computer instructions that are further effective to:
detect the notification selection by a fingertip pressed at an area of a touch-enabled screen included in the device, wherein the user's fingerprint is received from the fingertip at the area of the touch-enabled screen.

16. The computer program product of claim 13 wherein the receiving of the gesture further comprises additional computer instructions that are further effective to:
detect the notification selection by a fingertip pressed at a first area of the device that is on a surface of a touch-enabled screen included in the device; and
detect a sliding motion of the fingertip from the first area to a second area of the device, wherein the second area of the device is a fingerprint sensor where the user's fingerprint is received.

17. The computer program product of claim 13 further comprising additional computer instructions that are further effective to:
compare the user's fingerprint to one or more authorized fingerprints corresponding to one or more authorized uses of the device, wherein the action is performed in response to the user's fingerprint matching one of the authorized fingerprints; and
inhibit performance of the action in response to the user's fingerprint failing to match any of the authorized fingerprints.

* * * * *